US009168632B2

(12) United States Patent
Miletto Petrazzini

(10) Patent No.: US 9,168,632 B2
(45) Date of Patent: Oct. 27, 2015

(54) POWER HONING/GRINDING MACHINE FOR THE FINISHING OF CYLINDRICAL GEARS WITH EXTERNAL TOOTHING TOOLS

(75) Inventor: Alberto Miletto Petrazzini, Turin (IT)

(73) Assignee: Samputensili France S.a.r.L., Saint Etienne (FR)

( * ) Notice: Subject to any disclaimer, the term of this patent is extended or adjusted under 35 U.S.C. 154(b) by 559 days.

(21) Appl. No.: 13/563,601

(22) Filed: Jul. 31, 2012

(65) Prior Publication Data

US 2013/0034398 A1 Feb. 7, 2013

(30) Foreign Application Priority Data

Aug. 1, 2011 (IT) .............................. TO2011A0709

(51) Int. Cl.
*B23Q 5/10* (2006.01)
*B24B 41/04* (2006.01)
*B23F 23/00* (2006.01)

(52) U.S. Cl.
CPC .............. *B24B 41/044* (2013.01); *B23F 23/006* (2013.01); *B23Q 5/10* (2013.01); *Y10T 409/109699* (2015.01)

(58) Field of Classification Search
CPC ...... B23Q 5/10; B23Q 5/27; B23Q 2217/006; B23F 1/06; B23F 23/1293
USPC ................... 409/4, 8, 231; 408/124; 173/217; 451/398
See application file for complete search history.

(56) References Cited

U.S. PATENT DOCUMENTS

| 2,202,222 | A | * | 5/1940 | Moller ............................ 408/16 |
| 3,103,143 | A | * | 9/1963 | Perger ............................. 409/4 |
| 2004/0105731 | A1 | | 6/2004 | Kreh |
| 2008/0231129 | A1 | * | 9/2008 | Kubo et al. .................. 310/90.5 |
| 2010/0178125 | A1 | * | 7/2010 | Tatsuda ........................ 409/183 |

FOREIGN PATENT DOCUMENTS

| DE | 19916710 A1 | 10/2000 |
| DE | 202009014940 U1 | 10/2010 |
| DE | 102009038223 A1 | 2/2011 |

OTHER PUBLICATIONS

Italian search report for application No. TO20110709 dated May 16, 2012.

* cited by examiner

*Primary Examiner* — Sunil K Singh
*Assistant Examiner* — Alan Snyder
(74) *Attorney, Agent, or Firm* — Patterson & Sheridan, LLP

(57) ABSTRACT

Power honing/grinding machine for the finishing of cylindrical gears with external toothing tools, comprising a workpiece clamping unit having a first electrospindle rotatable about a first axis, and a tool-holder unit having a second electrospindle rotatable about a second axis, in which the movement of rotation of the second electrospindle about the second axis is synchronized with the movement of rotation of the first electrospindle about the first axis, wherein the first electrospindle has an external stator and an internal rotor and the second electrospindle has an internal stator and an external rotor.

8 Claims, 6 Drawing Sheets

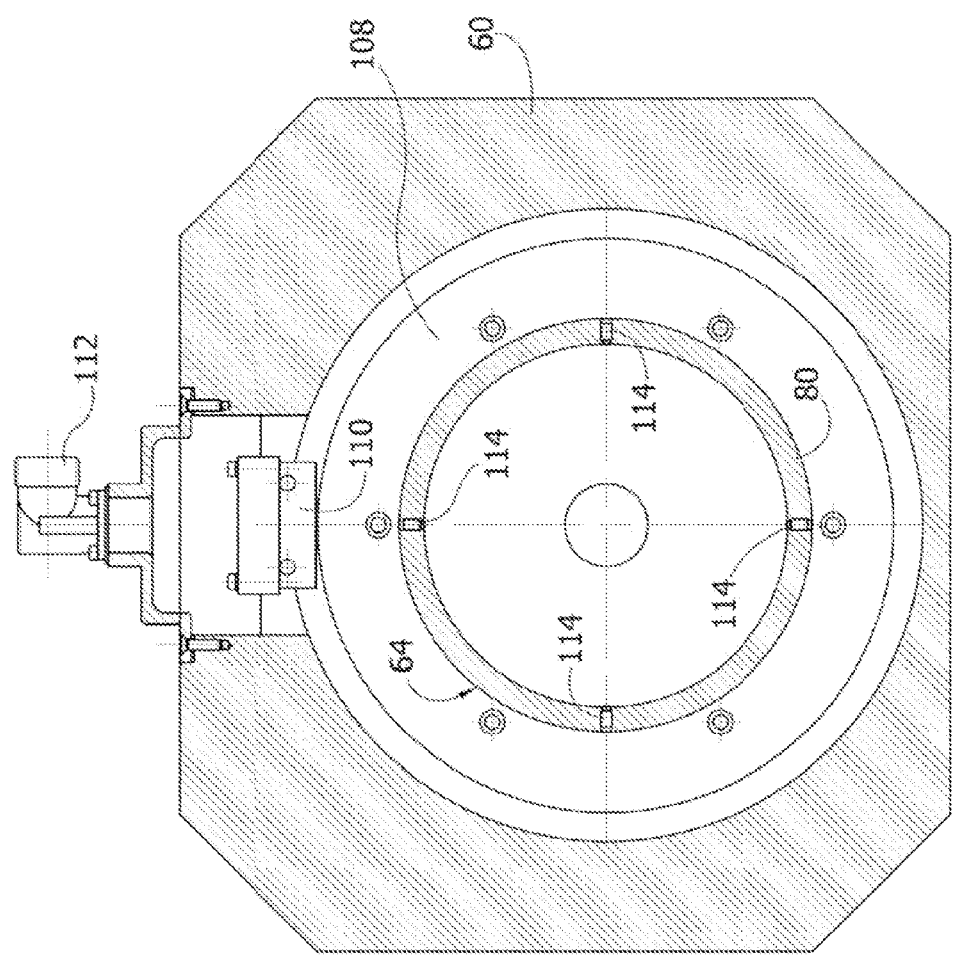
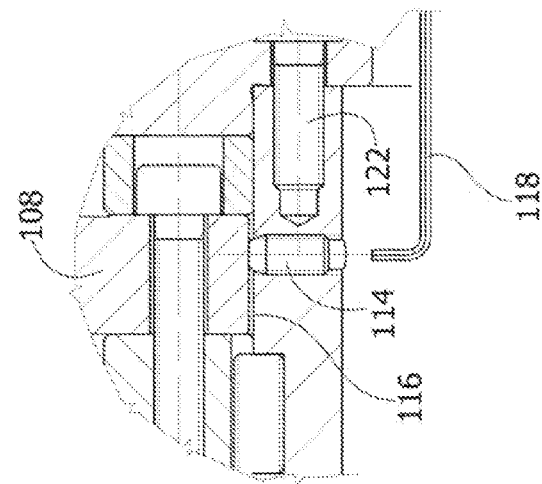

POWER HONING/GRINDING MACHINE FOR THE FINISHING OF CYLINDRICAL GEARS WITH EXTERNAL TOOTHING TOOLS

CROSS-REFERENCE TO RELATED APPLICATIONS

This application claims benefit of Italian patent application No. TO2011A000709, filed Aug. 1, 2011, which is herein incorporated by reference.

BACKGROUND OF THE INVENTION

1. Field of the Invention

The present invention relates to finishing processes after heat treatment of cylindrical gears.

More specifically, the invention relates to a power honing/grinding machine for the finishing of cylindrical gears with external toothing tools.

2. Description of the Related Art

A power honing machine of the known type comprises a workpiece clamping unit having a first electrospindle rotatable about a first axis, and a tool-holder unit having a second electrospindle rotatable about a second axis, wherein the movement of rotation of the second electrospindle about the second axis is synchronized with the movement of rotation of the first electrospindle about the first axis.

The honing process with synchronized axes and high removal of material is usually carried out on machines that use ceramic tools with internal toothing working on the principle of intersecting axes. The use of tools with internal toothing poses physical limits to the degree of intersection of the axes. In fact, the meshing of a gear with external toothing with a tool with internal toothing poses limits on the angle of mutual inclination between the respective axes of rotation. In practice, with the known solutions, employing tools with internal toothing values of 15-20° of inclination of the axes are not exceeded. Since the axial cutting speed is proportional to the sine of the angle of intersection of the axes, the limitation of the angle of intersection of the axes penalizes the axial cutting speed.

If an increased cutting speed is desired, without reaching prohibitive values of the gear clamping spindle speed, it is necessary to use tools with external toothing. External toothing tools do not limit the angle of intersection of the axes. With external toothing tools it is possible to reach intersection angles of the axes equal to 60°.

However, practical tests have shown that the use of external toothing tools in machines with electronic synchronization between the tool-holder spindle and the gear clamping spindle creates great problems of finishing quality. Indeed, disturbances in the rotation of one spindle have repercussions on the other spindle, sometimes triggering phenomena of self-maintenance of perturbations.

SUMMARY OF THE INVENTION

The present invention generally The present invention aims to provide a power honing/grinding machine which overcomes the problems of the prior art.

According to the present invention, this object is achieved by a machine having the characteristics forming the subject of claim 1.

The present invention aims to realize a power honing/grinding machine in which the electrospindle of the workpiece clamping unit has an external stator and an internal rotor while the electrospindle of the tool-holder unit has an internal stator and an external rotor.

Thanks to these characteristics, the electrospindle of the tool-holder unit has a much greater moment of inertia about its axis of rotation than the moment of inertia of the electrospindle of the workpiece clamping unit.

Production of an electrospindle with a hollow external rotor and a stator located inside the rotor allows, for the same external dimensions, multiplication of the moment of inertia by up to ten times with respect to a solution with an internal rotor and external stator.

In this way the rotational movement of the tool-holder electrospindle is essentially imperturbable against disturbances caused by the meshing of the tool with the piece being machined. This avoids the phenomena of propagation of disturbances between the gear clamping spindle and the tool-holder spindle.

The use of an external rotor also offers the possibility to mount an encoder with a large diameter, inherently more precise and with a large central hole. Consequently, it is possible to adopt a clearance correction system which allows cancelling the encoder disc mounting eccentricity relative to the axis of rotation.

BRIEF DESCRIPTION OF THE DRAWINGS

Further characteristics and advantages of the present invention will become clear in the course of the detailed description which follows, given purely by way of a non-limiting example, with reference to the accompanying drawings, wherein:

FIG. 6 is a section along the line VI-VI of FIG. 5, and FIG. 7 is a detail on an enlarged scale of the part indicated by the arrow VII in FIG. 5.

DETAILED DESCRIPTION

Figure 1:
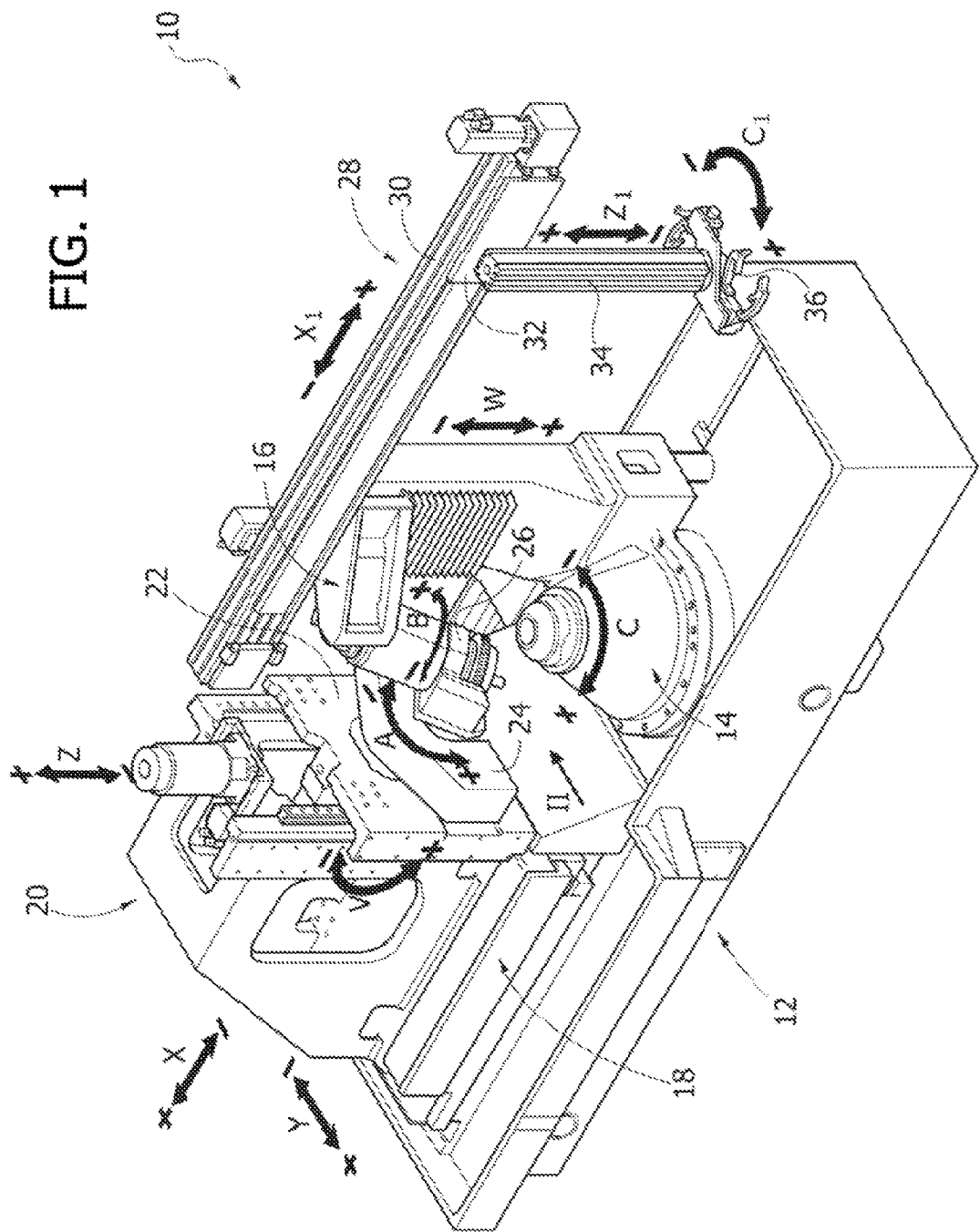
FIG. 1 is a schematic perspective view of a power honing/grinding machine according to the present invention.

With reference to FIG. 1, numeral 10 indicates a power honing/grinding machine for the finishing of cylindrical gears after their heat treatment. The machine 10 comprises a base 12 which carries a workpiece clamping unit 14 and a tailstock 16 equipped with a movement along a vertical axis W.

The base 12 of the machine 10 carries a board 18 equipped with a movement along a radial direction X. The board 18 carries a frame 20 equipped with a movement with respect to the board 18 along a transverse direction Y. The frame 20 carries a slide 22 equipped with a movement along a vertical direction Z. The slide 22 in turn carries an oscillating board 24 equipped with a pivoting movement V about a horizontal axis and with a rotational movement A relative to the slide 22. The oscillating board 24 carries a tool-holder unit 26.

The machine 10 may also be equipped with a mechanical hand 28 for the automatic loading and unloading of the pieces. The mechanical hand 28 comprises a stationary beam 30 on which a slide 32 can move, carrying a vertically movable arm 34 provided with a gripping member 36.

Figure 2:
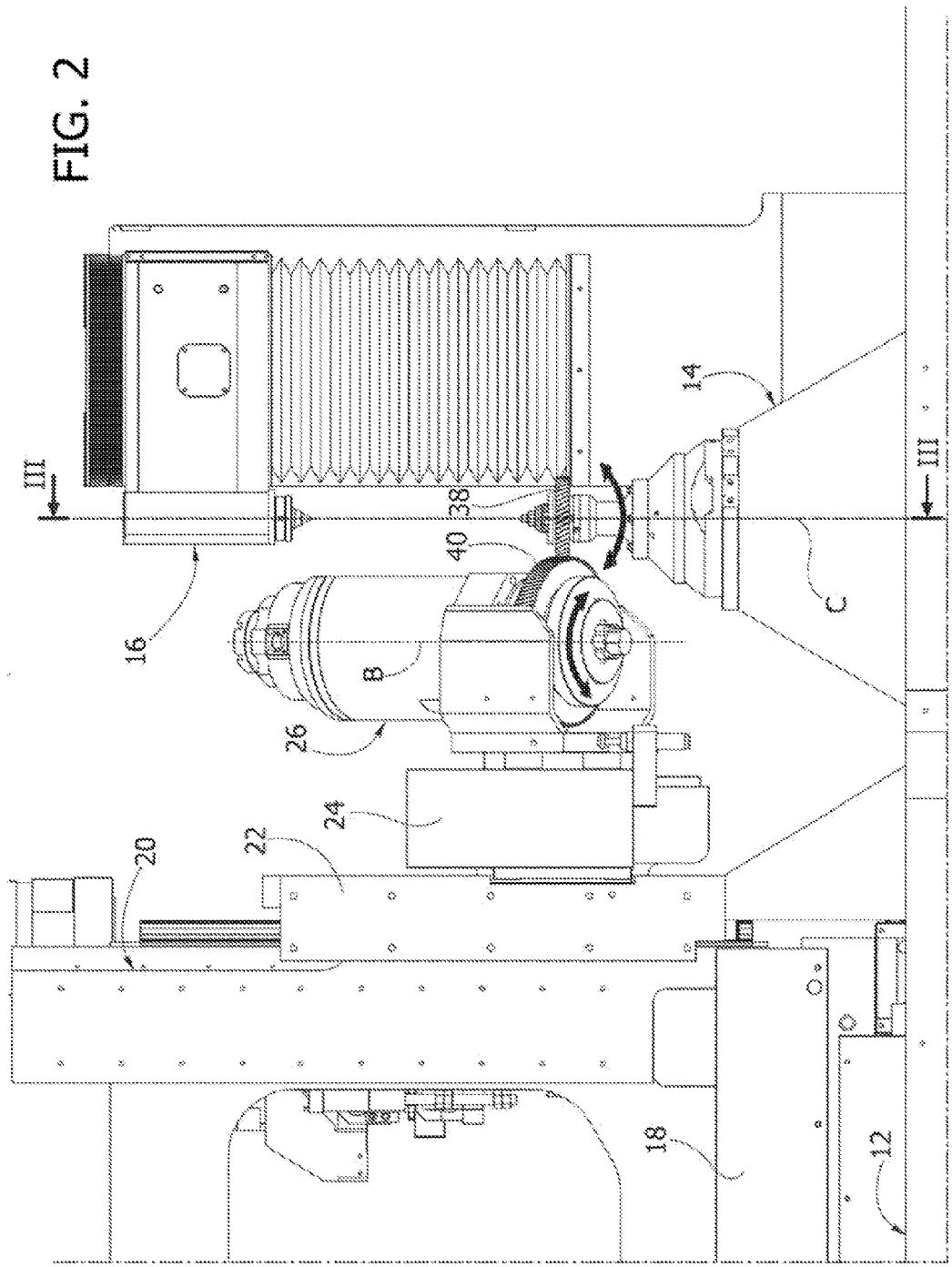
FIG. 2 is a front view on an enlarged scale of the part indicated by the arrow II of FIG. 1.

With reference to FIG. 2, when in use, the workpiece clamping unit 14 and the tool-holder unit 26 respectively carry a gear 38 and an external toothing tool 40 which mesh with each other. The workpiece clamping unit 14 and the tool-holder unit 26 operate in rotation about the axes C and B, the gear 38 and the tool 40 with angular velocity synchronized with each other. The axes of rotation C and B of the gear 38 and tool 40 are inclined to each other. The axial cutting speed on the flanks of the teeth of the gear 38 is proportional to the angle of inclination between the axes B and C. The axis of rotation C of the workpiece clamping unit 14 has a fixed orientation while the angle of inclination of the axis of rotation B of the tool-holder unit 26 can be adjusted by controlling the oscillating board 24 (rotation movement A).

Figure 3:
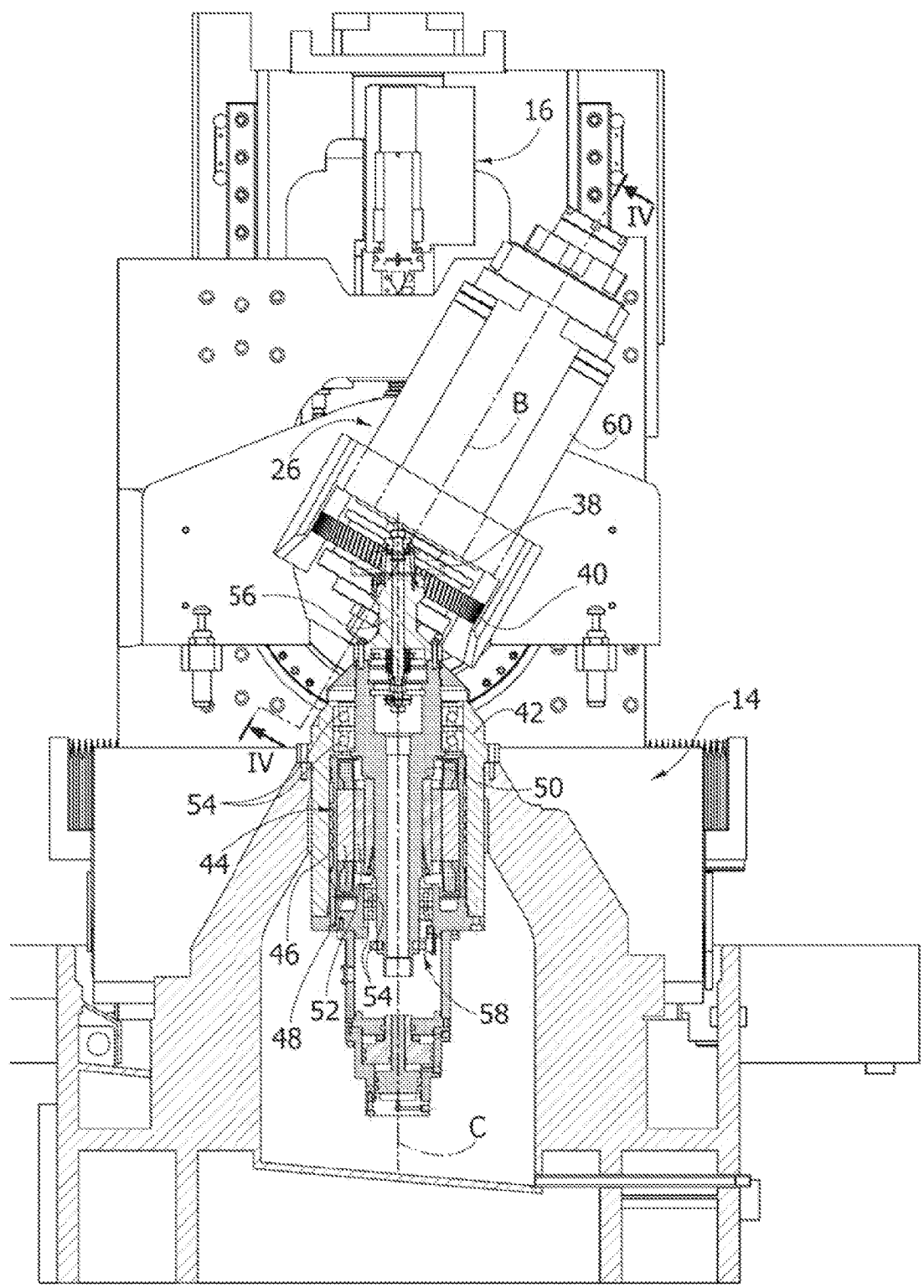
FIG. 3 is a section along the line III-III of FIG. 2.

With reference to FIG. 3, the workpiece clamping unit 14 comprises an external supporting body 42 onto which is mounted a first electrospindle 44. The electrospindle 44 comprises an external stator 46 fixed to the external supporting body 42 and carrying stator windings 48. The electrospindle 44 comprises an internal rotor 50 to which permanent magnets 52 are fixed, which face the stator windings 48. The rotor 50 is supported by the external body 42 by means of bearings 54. A workpiece clamping bushing 56 is fixed to one end of the rotor 50. Within the rotor 50 a hydraulically-operated locking device is housed which allows locking and unlocking of the clamping piece 38 on the clamping bushing 56. An encoder 58 is mounted at the lower end of the rotor 50.

Figure 4:
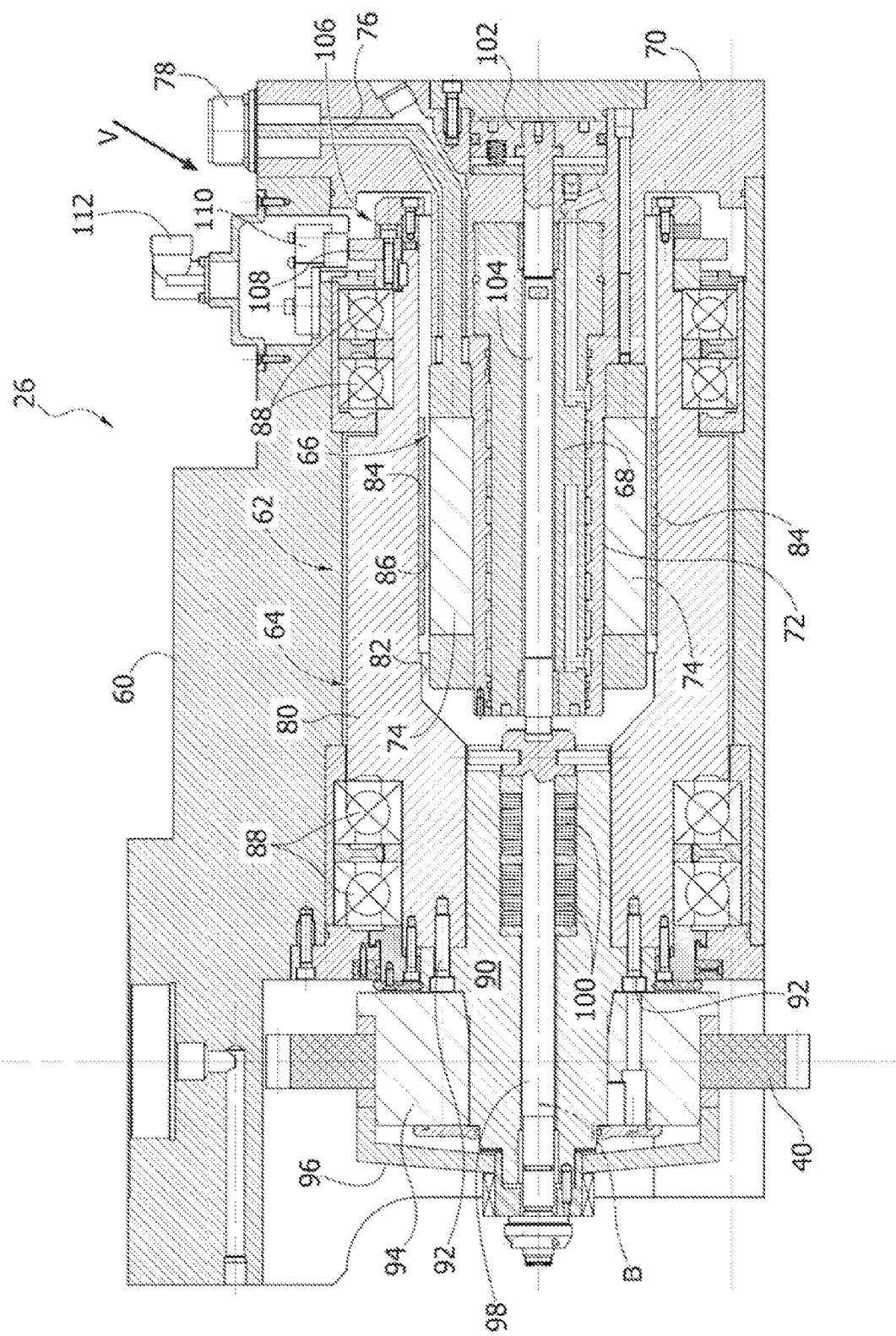
FIG. 4 is a section along the line IV-IV of FIG. 3.

With reference to FIG. 4, the tool-holder unit 26 comprises an external support 60 fixed with respect to the oscillating board 24. The external support 60 carries an electrospindle 62 comprising an external rotor 64 and an internal stator 66. The internal stator 66 comprises a hollow shaft 68 which is fixed to a bottom plate 70 in turn fixed to the external support 60. The inner shaft 68 carries a stator body 72 equipped with longitudinal slots in which the stator windings 74 are housed. The stator windings 74 are electrically connected to an electrical power cable 76 connected to an electric connector 78 placed on the bottom plate 70.

The external rotor 64 has a hollow section 80 with a cavity 82 in which the stator 66 is positioned. On the inner wall of the cavity 82 permanent magnets 84 are positioned, facing the outer periphery of the stator 66. An air gap 86 is provided between the stator windings 74 and the permanent magnets 84. The rotor 64 is rotatably carried about the axis B from the external support 60 by means of bearings 88. The rotor 64 comprises a lug 90 fixed to the hollow section 80, for example by screws 92. A tool-holder bushing 94 is fixed on the lug 90 of the rotor 64. The tool 40 is fixed on the tool-holder bushing 94 by a blocking flange 96 fixed to an axially movable tie rod 98 within the lug 90. A pack of cup springs 100 elastically pushes the tie rod 98 to a blocking position. The tie rod 98 can be pushed towards an unlocked position by a hydraulic unlocking cylinder 102 housed in the bottom plate 70 and connected to the tie rod 98 with a thrust shaft 104 extending within the fixed shaft 68 of the stator 66.

Figure 5:
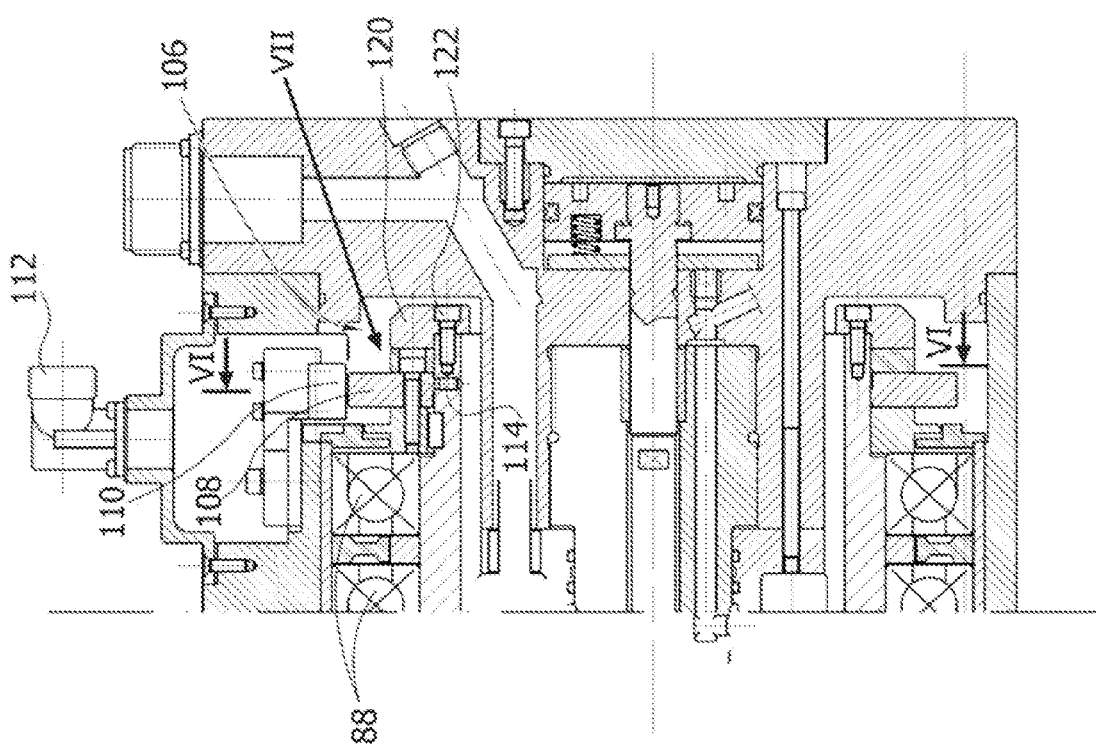
FIG. 5 is a detail of the part indicated by the arrow V in FIG. 4.

With reference to FIGS. 4 and 5, the second electrospindle 62 comprises an encoder 106 located at the end of the rotor 64 facing towards the bottom plate 70. The encoder 106 comprises a disc 108 fixed to the rotor 64 and a reading head 110 carried by the external support 60 and facing the outer periphery of the disc 108. The reading head 110 is electrically connected to a connector 112. The disc 108 of the encoder 106 is mounted on the outer surface of the rotor 64. Since the rotor 64 is externally positioned relative to the stator 66, the disc 108 has a large diameter. The encoder 106 is therefore inherently more accurate than an encoder with a disc of smaller diameter. In addition, the disc 108 of the encoder 106 has a large central hole whereby it is possible to provide a centring system, manually adjustable to cancel the centring tolerance of the disc 108 relative to the axis B.

As shown in greater detail in FIG. 6 and FIG. 7, the centring system of the disc 108 comprises a plurality of radial grub screws 114 which engage respective threaded holes in the wall of the hollow section 80 of the rotor 64.

The disc 108 is preliminarily mounted leaving a slight radial clearance. Subsequently, using the grub screws 114 and with the aid of suitable measuring instruments (for example a millesimal comparator) it is possible to act upon the inside of the grub screws 114 by means of an Allen key 118, thanks to the large central hole of the rotor. In this way the eccentricity of rotation of the encoder disc can be adjusted up to a null value. The reading accuracy of the encoder 106 is thus independent from the constructive tolerances of the bearings and the rotor.

The production of an electrospindle of the workpiece clamping group with internal rotor and an electrospindle of the tool-holder group with external rotor allows the obtaining of a large difference between the moments of inertia of the workpiece clamping spindle and the tool-holder spindle.

The moment of inertia of a tool-holder spindle with external rotor can be up to 10 times greater than the moment of inertia of a spindle with the same external dimensions but with an inner rotor.

The great difference between the moments of inertia of the tool-holder spindle and the workpiece clamping spindle ensures a sort of "imperturbability" of the tool 40 against the disturbances caused by meshing with the piece 38.

In view of the fact that the movements of rotation of the workpiece clamping spindle and the tool-holder spindle are electronically synchronized with each other, the large difference between the moments of inertia of the tool-holder spindle and the clamping spindle avoids the disturbances of the rotation of the workpiece clamping spindle being transmitted to the tool-holder spindle.

Thanks to the present invention, it is possible to use external toothing tools 40 for precision power honing/grinding machining on machines with synchronized axes. The use of external toothing tools allows the increasing of the angle of intersection between the axes B and C, with a consequent increase of the axial cutting speed at a given velocity of rotation of the workpiece clamping spindle.

Of course, without prejudice to the principle of the invention, the details of construction and the embodiments may be widely varied with respect to what is described and illustrated without thereby departing from the scope of the invention as defined by the claims that follow.

The invention claimed is:

1. Power honing/grinding machine for the finishing of cylindrical gears with external toothing tools, comprising:
    a workpiece clamping unit having a first electrospindle rotatable about a first axis, wherein the first electrospindle has an external stator and an internal rotor and a first moment of inertia with respect to the first axis;
    a tool-holder unit having a second electrospindle rotatable about a second axis, wherein the second electrospindle has an internal stator and an external rotor and a second moment of inertia with respect to the second axis,
    wherein the movement of rotation of the second electrospindle about the second axis is synchronized with the movement of rotation of the first electrospindle about the first axis, and
    wherein the second moment of inertia is sufficiently greater than the first moment of inertia, whereby rotational disturbances of the first electrospindle are prevented from being transmitted to the second electrospindle.

2. Machine according to claim 1, wherein the external rotor of the second electrospindle has a hollow section having an inner surface on which permanent magnets are fixed facing towards the stator windings of the internal rotor.

3. Machine according to claim 1, wherein the second electrospindle comprises an encoder including a disc fixed to the external rotor, the disc of the encoder being associated with the control system including a plurality of radial grub screws for adjusting the centring of the disc relative to the axis of rotation of the rotor.

4. Machine according to claim 1, wherein the first axis and the second axis are inclined relative to each other.

5. Machine according to claim 4, wherein the tool-holder unit is vertically and horizontally movable relative to the workpiece clamping unit.

6. Machine according to claim 1, wherein an angular velocity of the first electrospindle and the second electrospindle are electronically synchronized with each other.

7. Machine according to claim 5, wherein the tool-holder unit is horizontally movable via a board and a frame, and the tool-holder unit is vertically movable via a slide.

8. Machine according to claim 7, wherein the tool-holder unit is rotatable relative to the slide via an oscillating board.

* * * * *